United States Patent
Liu et al.

(10) Patent No.: US 11,370,708 B2
(45) Date of Patent: Jun. 28, 2022

(54) FIBER CEMENT MATERIAL FORMULATIONS AND COMPOSITIONS THEREOF

(71) Applicant: James Hardie Technology Limited, Dublin (IE)

(72) Inventors: Xiangyuan Liu, Rancho Cucamonga, CA (US); Huagang Zhang, Rancho Cucamonga, CA (US); Jongmin Keum, Rancho Cucamonga, CA (US); Yongjun Chen, Rancho Cucamonga, CA (US); Yan Li, Rancho Cucamonga, CA (US); Weiling Peng, Rancho Cucamonga, CA (US); Thinh Pham, Yucaipa, CA (US); Farshad J. Motamedi, Mission Viejo, CA (US); Lijun Mao, Rancho Cucamonga, CA (US); Thomas Mueller, Yucaipa, CA (US)

(73) Assignee: James Hardie Technology Limited, Dublin (IE)

(*) Notice: Subject to any disclaimer, the term of this patent is extended or adjusted under 35 U.S.C. 154(b) by 114 days.

(21) Appl. No.: 17/075,316

(22) Filed: Oct. 20, 2020

(65) Prior Publication Data
US 2021/0114933 A1      Apr. 22, 2021

Related U.S. Application Data

(60) Provisional application No. 62/924,584, filed on Oct. 22, 2019.

(51) Int. Cl.
| | | |
|---|---|---|
| C04B 28/04 | (2006.01) | |
| E04C 5/07 | (2006.01) | |
| C04B 14/06 | (2006.01) | |
| C04B 14/18 | (2006.01) | |
| C04B 18/24 | (2006.01) | |
| C04B 22/06 | (2006.01) | |
| C04B 14/08 | (2006.01) | |
| C04B 111/40 | (2006.01) | |

(52) U.S. Cl.
CPC .............. C04B 28/04 (2013.01); C04B 14/06 (2013.01); C04B 14/08 (2013.01); C04B 14/18 (2013.01); C04B 18/24 (2013.01); C04B 22/06 (2013.01); E04C 5/073 (2013.01); C04B 2111/40 (2013.01)

(58) Field of Classification Search
CPC ......... C04B 14/06; C04B 14/08; C04B 14/18; C04B 14/303; C04B 18/16; C04B 18/24; C04B 18/027; C04B 22/06; C04B 28/04; C04B 40/0064; C04B 40/024; C04B 2111/40; C04B 2111/76; C04B 2111/00612; E04C 5/073; Y02W 30/91
See application file for complete search history.

(56) References Cited

U.S. PATENT DOCUMENTS

| | | | | |
|---|---|---|---|---|
| 7,942,964 | B2 * | 5/2011 | Luo | C04B 28/02 106/713 |
| 8,133,352 | B2 * | 3/2012 | Merkley | C04B 28/02 106/737 |
| 8,333,836 | B2 * | 12/2012 | Luo | C04B 28/02 106/713 |

* cited by examiner

*Primary Examiner* — Anthony J Green
(74) *Attorney, Agent, or Firm* — Knobbe, Martens, Olson & Bear, LLP (57) ABSTRACT

A fiber cement material formulation comprising a cementitious binder, a siliceous material, fiber, alumina trihydrate and a bifunctional low density additive wherein the bifunctional low density additive comprises any one or more of diatomaceous earth, recycled autoclave fiber cement dust or cellulose dust. The fiber cement material formulation optionally further comprises a secondary low density additive which may be perlite. In some embodiments, a fiber cement article manufactured from the fiber cement material formulation comprises a density of approximately 1.1 g/cm³ or below.

20 Claims, 1 Drawing Sheet

FIBER CEMENT MATERIAL FORMULATIONS AND COMPOSITIONS THEREOF

BACKGROUND

Field

The present disclosure relates generally to fiber cement material formulations and compositions thereof.

Description of the Related Art

Any discussion of the prior art throughout the specification should in no way be considered as an admission that such prior art is widely known or forms part of the common general knowledge in the field.

The principal components of a fiber cement material formulation are typically a cementitious binder, a siliceous material, and fiber. Fiber cement articles made using this type of formulation are known to be much heavier than building materials made using other materials, for example, wood or vinyl building articles. Typically, densities of such fiber cement articles are 1.3 g/cm$^3$ or greater. Much has been done to reduce the density of fiber cement building articles by introducing low density materials into the fiber cement material formulation. Generally, low density materials reduce the density of the fiber cement building articles by introducing a plurality of interstices into the fiber cement material.

Traditionally, the low density materials used to create the interstices in the fiber cement material have been in the form of hollow closed cell structures such as, for example, cenospheres or the like. Use of hollow closed cell structures ensure that the resulting low density fiber cement articles are suitable for use in wet and cold climate zones as liquids are unable to penetrate into the interstices of the low density material, however such low density materials are expensive.

It is therefore desirable to provide a new fiber cement material formulation and composition thereof that is less expensive to manufacture and provides low density fiber cement building products that are suitable for use in wet and cold climate zones.

SUMMARY

Disclosed herein are fiber cement material formulations that are suitable for use in the manufacture of building products that are suitable for use in wet and cold climate zones.

In some embodiments, the fiber cement material formulation of the present disclosure comprises a cementitious binder, a siliceous material, fiber, alumina trihydrate and a bifunctional low density additive.

The fiber cement formulations of the present disclosure are suitable to manufacture a fiber cement article. Accordingly, the present disclosure also provides a method of making a fiber cement article from a fiber cement material formulation. In one embodiment, the fiber cement article comprises a density of approximately 1.1 g/cm$^3$ or below. In a further embodiment, the fiber cement article comprises a density in the range of between approximately 0.75 g/cm$^3$ and approximately 1.2 g/cm$^3$. In one embodiment, the fiber cement article is suitable for use as a building material, for example, as a fiber cement trim product.

For the purposes of this specification, the term 'comprise' shall have an inclusive meaning. Thus, it is understood that it should be taken to mean an inclusion of not only the listed components it directly references, but also non-specified components. Accordingly, the term 'comprise' is to be attributable with as broad an interpretation as possible and this rationale should also be used when the terms 'comprised' and/or 'comprising' are used.

Further aspects or embodiments of the present disclosure will become apparent from the ensuing description which is given by way of example only.

In one embodiment, the fiber cement material formulation comprises: a cementitious binder and a siliceous material, wherein the cementitious binder and siliceous material comprise between 60 wt % and 85 wt % of the fiber cement material formulation, and wherein the cementitious binder comprises Portland cement, and wherein the siliceous material comprises silica having a surface area between 300 and 700 m2/kg; fiber, wherein the fiber comprises between 6 wt % and 12 wt % of the fiber cement material formulation, wherein the fiber comprises bleached cellulose fiber, the bleached cellulose fiber having a kappa number of between 0 and 5 by TAPPI method T236; alumina trihydrate, wherein the alumina trihydrate comprises between 1 wt % and 5 wt % of the fiber cement material formulation; a bifunctional low density additive, the bifunctional low density additive comprising diatomaceous earth, wherein the diatomaceous earth comprises at least 70% amorphous silica and a tapped bulk density of between 0.3 and 0.6 g/cm3, and wherein the diatomaceous earth comprises between 2 wt % and 10 wt % of the fiber cement material formulation; and a secondary low density additive, wherein the secondary low density additive comprises perlite, and wherein the perlite comprises between 2 wt % and 10 wt % of the fiber cement material formulation, and wherein a ratio of the perlite to the diatomaceous earth is between 1:0.5 and 1:2. In some embodiments, the diatomaceous earth comprises between 4 wt % and 6 wt % of the fiber cement material formulation. In some embodiments, the perlite comprises between 4 wt % and 8 wt % of the fiber cement material formulation. In some embodiments, the fiber comprises between 8 wt % and 10 wt % of the fiber cement material formulation. In some embodiments, the cementitious binder comprises between 35 wt % and 40 wt % of the fiber cement material formulation. In some embodiments, the siliceous material comprises between 40 wt % and 45 wt % of the fiber cement material formulation. In some embodiments, the silica is silica 200 mesh, and wherein the surface area is between 300 and 410 m$^2$/kg. In some embodiments, a ratio of the siliceous material to the cementitious binder is between 1:0.5 and 1:1.5.

In one embodiment, the fiber cement material formulation comprises: a cementitious binder and a siliceous material, wherein the cementitious binder and siliceous material comprise between 60 wt % and 85 wt % of the fiber cement material formulation; fiber, wherein the fiber comprises between 6 wt % and 12 wt % of the fiber cement material formulation, wherein the fiber comprises cellulose fiber; alumina trihydrate, wherein the alumina trihydrate comprises between 1 wt % and 5 wt % of the fiber cement material formulation; a bifunctional low density additive, the bifunctional low density additive comprising diatomaceous earth, wherein the diatomaceous earth comprises between 2 wt % and 10 wt % of the fiber cement material formulation; and a secondary low density additive, wherein the secondary low density additive comprises perlite, and wherein the perlite comprises between 2 wt % and 10 wt % of the fiber cement material formulation, and wherein a ratio of the perlite to the diatomaceous earth is between 1:0.5 and 1:2. In some embodiments, the cementitious binder and siliceous material comprise between 70 wt % and 80 wt % of the fiber cement material formulation, and wherein a ratio of the siliceous material to the cementitious binder is between 1:0.5 and 1:1.5. In some embodiments, the cementitious binder comprises between 35 wt % and 40 wt % of the fiber cement material formulation, and wherein the siliceous material comprises between 40 wt % and 45 wt % of the fiber cement material formulation. In some embodiments, the perlite comprises between 4 wt % and 8 wt % of the fiber cement material formulation, and wherein the diatomaceous earth comprises between 4 wt % and 6 wt % of the fiber cement material formulation. In some embodiments, the diatomaceous earth comprises at least 70% amorphous silica and a tapped bulk density of between 0.3 and 0.6 g/cm$^3$. In some embodiments, the cellulose fiber comprises bleached cellulose fiber, the bleached cellulose fiber having a kappa number of between 0 and 5 by TAPPI method T236.

In one embodiment, the fiber cement material formulation comprises: a cementitious binder and a siliceous material, wherein the cementitious binder and siliceous material comprise between 60 wt % and 85 wt % of the fiber cement material formulation; fiber, wherein the fiber comprises between 6 wt % and 12 wt % of the fiber cement material formulation, wherein the fiber comprises cellulose fiber; alumina trihydrate, wherein the alumina trihydrate comprises between 1 wt % and 5 wt % of the fiber cement material formulation; a bifunctional low density additive, the bifunctional low density additive comprising diatomaceous earth, wherein the diatomaceous earth comprises between 2 wt % and 10 wt % of the fiber cement material formulation; and a secondary low density additive, wherein the secondary low density additive comprises perlite, and wherein the perlite comprises between 2 wt % and 10 wt % of the fiber cement material formulation. In some embodiments, the diatomaceous earth comprises between 4 wt % and 8 wt % of the fiber cement material formulation and the perlite comprises between 4 wt % and 8 wt % of the fiber cement material formulation. In some embodiments, a ratio of the perlite to the diatomaceous earth is between 1:0.5 and 1:2. In some embodiments, the cementitious binder and siliceous material comprise between 70 wt % and 80 wt % of the fiber cement material formulation and the fiber comprises between 8 wt % and 10 wt % of the fiber cement material formulation. In some embodiments, the diatomaceous earth comprises at least 70% amorphous silica and a tapped bulk density of between 0.3 and 0.6 g/cm$^3$. In some embodiments, the fiber comprises bleached cellulose fiber.

In one embodiment, the fiber cement material formulation comprises: a cementitious binder and a siliceous material, wherein the cementitious binder and siliceous material comprise between 60 wt % and 85 wt % of the fiber cement material formulation; fiber, wherein the fiber comprises between 6 wt % and 12 wt % of the fiber cement material formulation, wherein the fiber comprises cellulose fiber; alumina trihydrate, wherein the alumina trihydrate comprises between 1 wt % and 5 wt % of the fiber cement material formulation; a bifunctional low density additive, the bifunctional low density additive comprising between 2 wt % and 10 wt % of the fiber cement material formulation; and a secondary low density additive, the secondary low density additive comprising between 2 wt % and 10 wt % of the fiber cement material formulation.

Natural or processed low cost mineral materials have generally been regarded as less effective at reducing density and also as negatively impacting machine operability and runability during the manufacturing process. In one embodiment, the bifunctional low density additive of the fiber cement material formulation is selected from the group of natural or processed low cost mineral materials. It has now been found that diatomaceous earth, a natural low cost mineral comprising at least approximately 70% amorphous silica, when used in a suitable amount in the fiber cement material formulation, acts as a low density additive while also contributing to the overall structural integrity of the fiber cement article.

In one embodiment, a suitable range of diatomaceous earth comprising at least approximately 70% amorphous silica in the fiber cement material formulation is between approximately 7 wt % and approximately 22 wt % of the total wt % in the fiber cement material formulation. In another embodiment, a suitable range of diatomaceous earth comprising at least approximately 70% amorphous silica in the fiber cement material formulation is between approximately 7 wt % and approximately 15 wt % of the total wt % in the fiber cement material formulation. In a further embodiment, the suitable range of diatomaceous earth comprising at least approximately 70% amorphous silica in the fiber cement material formulation, comprises any sub-range between approximately 7 wt % and approximately 22 wt % of the total wt % in the fiber cement material formulation. The tapped bulk density of diatomaceous earth used as a suitable bifunctional low density additive is between approximately 0.3 and 0.6 g/cm$^3$. As will be described in greater detail below, diatomaceous earth is a bifunctional low density additive that effectively reduces the density of the fiber cement article while also achieving the desired physical performance properties.

In a further embodiment, the bifunctional low density additive of the fiber cement material formulation is recycled autoclaved fiber cement dust, such as ground, sanding or machining autoclaved fiber cement dust collected from processing of cured fiber cement products. In one embodiment, a suitable range of recycled autoclaved fiber cement dust in the fiber cement material formulation is between approximately 6 wt % and approximately 12 wt % of the total wt % in the fiber cement material formulation. In a further embodiment, the suitable range of recycled autoclaved fiber cement dust in the fiber cement material formulation, comprises any sub-range between approximately 6 wt % and approximately 12 wt % of the total wt % in the fiber cement material formulation. In a further embodiment, recycled autoclaved fiber cement dust comprises approximately 7.5 wt % of the total wt % in the fiber cement material formulation. The tapped bulk density of recycled autoclaved fiber cement dust used as a suitable bifunctional low density additive ranges between approximately 0.65 g/cm$^3$ to 0.97 g/cm$^3$. In one embodiment, the tapped bulk density of recycled autoclaved fiber cement dust used as a suitable bifunctional low density additive is 0.84 g/cm$^3$. As will be described in greater detail below, recycled autoclaved fiber cement dust is a bifunctional low density additive that effectively reduces the density of the fiber cement article while also achieving the desired physical performance properties.

In a further embodiment, the bifunctional low density additive of the fiber cement material formulation is cellulose dust. In one embodiment, a suitable range of cellulose dust in the fiber cement material formulation is between approximately 2 wt % and approximately 12 wt % of the total wt % in the fiber cement material formulation. In another embodiment, a suitable range of cellulose dust in the fiber cement material formulation is between approximately 2 wt % and approximately 10 wt % of the total wt % in the fiber cement material formulation. In a further embodiment, a suitable range of cellulose dust in the fiber cement material formulation is between approximately 2 wt % and approximately 5.5 wt % of the total wt % in the fiber cement material formulation. In a further embodiment, a suitable range of cellulose dust in the fiber cement material formulation is between approximately 2 wt % and approximately 4 wt % of the total wt % in the fiber cement material formulation. In a further embodiment, a suitable range of cellulose dust in the fiber cement material formulation is between approximately 4 wt % and approximately 5.5 wt % of the total wt % in the fiber cement material formulation. In a further embodiment, a suitable range of cellulose dust in the fiber cement material formulation is any sub-range between approximately 2 wt % and approximately 12 wt % of the total wt % in the fiber cement material formulation. The density of cellulose dust is variable depending on the source of cellulose dust. In the present disclosure, the tapped bulk density of cellulose dust used as a suitable bifunctional low density additive can be between approximately 0.1 and 0.3 g/cm$^3$. As will be described in greater detail below, cellulose dust is a bifunctional low density additive that effectively reduces the density of the fiber cement article while also achieving the desired physical performance properties.

In a further embodiment, the fiber cement material formulation comprises a combination of at least two bifunctional low density additives wherein the combination of bifunctional low density additives are any combination of diatomaceous earth, cellulose dust or recycled autoclaved fiber cement dust, such as sanding or machining autoclaved fiber cement dust collected from processing of cured fiber cement products, for example, a combination of diatomaceous earth and cellulose dust or diatomaceous earth and recycled autoclaved fiber cement dust, or a combination of cellulose dust and recycled autoclaved fiber cement dust. Where the fiber cement material formulation comprises two or more bifunctional low density additives, such as those discussed above, the wt % of each of the two or more bifunctional low density additives with respect to the total wt % of the fiber cement material formulation and/or the combined wt % of the bifunctional low density additives can vary. A combined wt % for the two or more bifunctional low density additives can be between approximately 2 wt % and approximately 25 wt % of the total wt % of the fiber cement material formulation, and each of the respective ones of the bifunctional low density additives can constitute a certain percent or a certain range of the combined wt %. The wt % or range of wt % of each of the two or more bifunctional low density additives in some embodiments of the fiber cement formulation can be any of the wt % or ranges of wt % listed elsewhere herein with respect to, for example, the diatomaceous earth, cellulose dust, or recycled autoclaved fiber cement dust.

Optionally in a further embodiment, the fiber cement material formulation comprises a secondary low density additive, wherein the secondary low density additive is perlite. Perlite typically comprises silicon dioxide, aluminium oxide, sodium oxide, potassium oxide, iron oxide, magnesium oxide and calcium oxide in various weight percentage combinations in which silicon dioxide is the principle component. In one embodiment, the secondary low density additive is regarded as being a low cost closed cell perlite in which the perlite comprises a particle size distribution between approximately 0 μm and 600 μm. For example, the perlite can comprise a particle size distribution between approximately 0 μm and 45 μm, between approximately 45 μm and 600 μm, between approximately 45 μm and 250 μm, or between approximately 100 μm and 600 μm, or any value or range within or bounded by any of these ranges. In some embodiments, portions of the perlite comprise different particle sizes and/or difference particle size distributions. For example, a first portion of the perlite can comprise a particle size distribution between approximately 0 μm and 45 μm and a second portion of the perlite can comprise a particle size distribution between approximately 45 μm and 600 μm. Perlites obtained from any one of the following sources exemplify the low cost closed cell perlites that are suitable for use in the fiber cement formulation of the present disclosure; P-Grade IMP; LDA3 or HP2000 Dicaperl® Perlite; coated or uncoated, 100N1110 or 100U0010 grade Termolita® Perlite; AGP JH-40 or AGP JH-40 American Garden Perlite; or Imerys-1 (full size range) or Imerys-2 (<500 μm) Imerys Perlite. In one embodiment, a suitable range of secondary low density additive in the fiber cement material formulation is between approximately 4 wt % and approximately 8 wt % of the total wt % in the fiber cement material formulation. In a further embodiment, the suitable range of secondary low density additive in the fiber cement material formulation, comprises any sub-range between approximately 4 wt % and approximately 8 wt % of the total wt % in the fiber cement material formulation.

In a further embodiment, the fiber cement material formulation of the present disclosure comprises a cementitious binder; a siliceous material; fiber; alumina trihydrate; a bifunctional low density additive wherein the bifunctional low density additive comprises one or more of diatomaceous earth, recycled autoclaved fiber cement dust or cellulose dust; and a secondary low density additive wherein the secondary low density additive comprises perlite.

In a further embodiment, the fiber cement material formulation of the present disclosure comprises a cementitious binder; a siliceous material; fiber; alumina trihydrate; a bifunctional low density additive wherein the bifunctional low density additive comprises any combination of diatomaceous earth, cellulose dust or recycled autoclaved fiber cement dust, such as sanding or machining autoclaved fiber cement dust collected from processing of cured fiber cement products, can also be combined with the secondary low density additive; and a secondary low density additive wherein the secondary low density additive comprises perlite. In one example, the combination of diatomaceous earth, cellulose dust or recycled autoclaved fiber cement dust, such as sanding or machining autoclaved fiber cement dust collected from processing of cured fiber cement products as the bifunctional low density additive could be diatomaceous earth and cellulose dust; or diatomaceous earth and recycled autoclaved fiber cement dust; or a combination of cellulose dust and recycled autoclaved fiber cement dust.

In one embodiment of the present disclosure, the cementitious binder and the siliceous material together form a major component of the fiber cement material formulation. In one embodiment, the cementitious binder and siliceous material comprise between approximately 67 wt % and approximately 82 wt % of the total wt % of the fiber cement material formulation wherein the ratio of siliceous material to cementitious binder ranges between 1:0.5 and 1:1.5. In a further embodiment, the suitable range of cementitious binder and siliceous material in the fiber cement material formulation comprises any sub-range between approximately 67 wt % and approximately 82 wt % of the total wt % in the fiber cement material formulation wherein the ratio of siliceous material to cementitious binder ranges between 1:0.5 and 1:1.5 or any subrange thereof.

In one embodiment of the present disclosure, the cementitious binder comprises a cement, preferably Portland cement. In one embodiment, the cementitious binder comprises between approximately 25 wt % and approximately 45 wt % of the total wt % of the fiber cement material formulation. In a further embodiment, the suitable range of cementitious binder in the fiber cement material formulation comprises any sub-range between approximately 25 wt % and approximately 45 wt % of the total wt % in the fiber cement material formulation.

In one embodiment of the present disclosure, the siliceous material comprises silica. In some embodiments, the silica is silica 200 mesh, wherein the silica has a surface area of approximately 300 to 410 $m^2$/kg or any subrange thereof. In some embodiments, the silica is silica 200 mesh, wherein the silica has a surface area of approximately 350 to 410 $m^2$/kg or any subrange thereof. In one exemplary embodiment, the silica is silica 200 mesh with a surface area of approximately 314 $m^2$/kg. In further embodiments, the silica is fine silica, wherein the fine silica has a surface area of approximately 550 to 650 $m^2$/kg or any subrange thereof. In one exemplary embodiment, the silica is silica 325 mesh with a surface area of approximately 605 $m^2$/kg. In further embodiments the siliceous material is a combination of both silica and fine silica. In one embodiment, the siliceous material comprises between approximately 25 wt % and approximately 50 wt % of the total wt % of the fiber cement material formulation. In a further embodiment, the suitable range of siliceous material in the fiber cement material formulation comprises any sub-range between approximately 25 wt % and approximately 50 wt % of the total wt % in the fiber cement material formulation.

In some embodiments where the cementitious binder comprises between approximately 25 wt % and approximately 45 wt % of the total wt % of the fiber cement material formulation and the siliceous material comprises between approximately 25 wt % and approximately 50 wt % of the total wt % of the fiber cement material formulation, the combined total weight of the cementitious binder and siliceous material comprises between approximately 67 wt % and approximately 82 wt % of the total wt % of the fiber cement material formulation wherein the ratio of siliceous material to cementitious binder ranges between 1:0.5 and 1:1.5.

In one embodiment of the present disclosure, the fiber is cellulose fiber. In one embodiment, the cellulose fibers are sourced from Kraft pulp, wherein the cellulose fibers have a length that is in the range of approximately 2 mm to 7 mm. In one embodiment, the cellulose fiber is bleached cellulose fiber, wherein the bleached fiber has a kappa number of between 0 and 5 by TAPPI method T236. In a further embodiment, the cellulose fiber is unbleached cellulose fiber, wherein the unbleached fiber has a kappa number of between 20 and 30 by TAPPI method T236, or between 22 and 28 by TAPPI method T236. In a further embodiment, the cellulose fiber is a combination of bleached and unbleached cellulose fiber, wherein the bleached fiber has a kappa number of between 0 and 5 by TAPPI method T236 and the unbleached fiber has a kappa number of between 20 and 30 by TAPPI method T236, or between 22 and 28 by TAPPI method T236. In one embodiment, the fiber comprises between approximately 7 wt % and approximately 10 wt % of the total wt % of the fiber cement material formulation. In a further embodiment, the suitable range of fiber in the fiber cement material formulation is any sub-range between approximately 7 wt % and approximately 10 wt % of the total wt % in the fiber cement material formulation.

In one embodiment of the present disclosure, the alumina trihydrate in the fiber cement material formulation is between approximately 2 wt % and approximately 4 wt % of the total wt % in the fiber cement material formulation. In a further embodiment, the suitable range of alumina trihydrate in the fiber cement material formulation is any sub-range between approximately 2 wt % and approximately 4 wt % of the total wt % in the fiber cement material formulation.

In one embodiment of the present disclosure, the fiber cement material formulation further comprises a hydrophobic agent, wherein the hydrophobic agent comprises a silane based hydrophobic agent which is used to improve water resistance. In one embodiment, the fiber cement material formulation can be easily treated with hydrophobic agents through a mixing or coating process.

In one embodiment, the present disclosure provides a fiber cement article comprising a fiber cement material formulation comprising a cementitious binder, a siliceous material, fiber, alumina trihydrate and a bifunctional low density additive wherein the bifunctional low density additive comprises one or more of diatomaceous earth, recycled autoclaved fiber cement dust or cellulose dust and wherein the density of the fiber cement article is between approximately 0.75 g/$cm^3$ and approximately 1.1 g/$cm^3$. In one embodiment, the present disclosure provides a fiber cement article comprising a fiber cement material formulation comprising a cementitious binder, a siliceous material, fiber, alumina trihydrate and a bifunctional low density additive wherein the bifunctional low density additive comprises one or more of diatomaceous earth, recycled autoclaved fiber cement dust or cellulose dust and a secondary low density additive wherein the secondary low density additive comprises perlite; and wherein the density of the fiber cement article is between approximately 0.75 g/$cm^3$ and approximately 1.1 g/$cm^3$. In a further embodiment, the fiber cement article further comprises a hydrophobic agent comprising a silane based hydrophobic agent which is used to improve water resistance in the fiber cement article. In one embodiment, the fiber cement material formulation can be easily treated with hydrophobic agents through a mixing or coating process.

The present disclosure further provides a fiber cement formulation wherein the formulation provides a fiber cement trim article suitable for use as a finishing material for the interior or exterior of a building. In some instances, the fiber cement trim article is suitable for use as a finishing material for surrounding the openings in a building, such as, for example window and door openings. In a further example, the fiber cement trim article is suitable for use as a finishing material for cladding materials. In certain embodiments, the fiber cement trim article comprises a width of between 1.5" (3.8 cm)±0.1" (0.3 cm) and 11.3" (28.6 cm)±0.13" (0.3 cm). In certain embodiments, the fiber cement trim article comprises a width of approximately 1.5" (3.8 cm), approximately 2.5" (6.3 cm), approximately 3.5" (8.9 cm), approximately 5.5" (14.0 cm), approximately 7.3" (18.4 cm), approximately 9.3" (23.6 cm), or approximately 11.3" (28.7 cm). In a further embodiment, the fiber cement trim article further comprises a thickness of between approximately 0.3" (0.8 cm)±0.1" (0.3 cm) and approximately 1.1" (2.8 cm)±0.1" (0.3 cm). In certain embodiments, the fiber cement trim article comprises a thickness of approximately 0.4" (1.0 cm), approximately 0.7" (1.8 cm), approximately 0.8" (1.9 cm), approximately 1.0" (2.4 cm), or approximately 1.1" (2.8 cm). Advantageously, the use of the bifunctional low density additives disclosed herein provides a lighter weight fiber cement article that comprises nailability and handleability properties normally associated with denser materials irrespective of the thickness of the formed article. The fiber cement trim article is provided at the above widths and thicknesses in various lengths. In one exemplary embodiment, the length of the fiber cement trim article is approximately 12 feet (365.8 cm) long. In such an exemplary embodiment, the fiber cement trim article can be used by the end user as is or alternatively can be cut to any smaller length as desired by the end user.

In some embodiments, the fiber cement formulation also provides a fiber cement cladding material, for example, plank, shingle or panel. In such embodiments, the cladding material comprises a thickness of between approximately 0.06" (1.5 mm) to approximately 0.4" (10.2 mm). In a further embodiment, the fiber cement cladding material comprises a width of between approximately 1.5" (3.8 cm)±0.13" (0.3 cm) and 4.0 ft (122 cm).

In some embodiments, a fiber cement article comprises a fiber cement formulation comprising a cementitious binder, a siliceous material, fiber, alumina trihydrate, a bifunctional low density additive, and a secondary low density additive. In one embodiment, the fiber cement formulation comprises approximately 36.0 wt % cementitious binder, approximately 43.0 wt % siliceous material, approximately 2.0 wt % alumina trihydrate, approximately 8.5 wt % bleached cellulose fiber, approximately 5.0 wt % bifunctional low density additive wherein the bifunctional low density additive is diatomaceous earth and approximately 5.5 wt % secondary low density additive, wherein the secondary low density additive is expanded perlite. In a further exemplary embodiment, the fiber cement formulation comprises approximately 36.0 wt % cementitious binder, approximately 42.7 wt % siliceous material, approximately 2.0 wt % alumina, approximately 8.5 wt % bleached cellulose fiber, approximately 5.0 wt % bifunctional low density additive wherein the bifunctional low density additive is diatomaceous earth and approximately 5.8 wt % secondary low density additive, wherein the secondary low density additive is expanded perlite. In some embodiments, the fiber cement formulation comprises between 10 wt % and 70 wt % cementitious binder, between 20 wt % and 60 wt % siliceous material, between 0.5 wt % and 10 wt % alumina trihydrate, between 1 wt % and 20 wt % bleached cellulose fiber, between 1 wt % and 15 wt % bifunctional low density additive wherein the bifunctional low density additive is diatomaceous earth, and between 1 wt % and 15 wt % secondary low density additive, wherein the secondary low density additive is expanded perlite. In some embodiments, the fiber cement formulation comprises between 20 wt % and 50 wt % cementitious binder, between 30 wt % and 50 wt % siliceous material, between 0.5 wt % and 5 wt % alumina trihydrate, between 5 wt % and 15 wt % bleached cellulose fiber, between 1 wt % and 10 wt % bifunctional low density additive wherein the bifunctional low density additive is diatomaceous earth, and between 1 wt % and 10 wt % secondary low density additive, wherein the secondary low density additive is expanded perlite. In some embodiments, the fiber cement formulation comprises between 30 wt % and 40 wt % cementitious binder, between 38 wt % and 48 wt % siliceous material, between 1 wt % and 3 wt % alumina trihydrate, between 5 wt % and 10 wt % bleached cellulose fiber, between 4 wt % and 8 wt % bifunctional low density additive wherein the bifunctional low density additive is diatomaceous earth, and between 4 wt % and 8 wt % secondary low density additive, wherein the secondary low density additive is expanded perlite.

The present application also provides a method of making a low density fiber cement article comprising the steps of:
(a) Preparing a cementitious slurry comprising a cementitious binder, a siliceous material, fiber, alumina trihydrate and a bifunctional low density additive wherein the bifunctional low density additive comprises one or more of diatomaceous earth, recycled autoclaved fiber cement dust or cellulose dust;
(b) Preparing an uncured laminated green sheet fiber cement material using the Hatschek process from the cementitious slurry; and
(c) Curing the uncured laminated green sheet fiber cement material in an autoclave unit at elevated temperatures and pressure conditions to form a cured low density fiber cement article.

In a further embodiment the method of making a low density fiber cement article comprises the further step of:
(d) coating the cured low density fiber cement article with a sealing agent.

In a further embodiment the method of making a low density fiber cement article comprises the further step of:
(e) coating the sealed cured low density fiber cement article with one or more coats of a coating agent to form a coated and sealed low density fiber cement article.

In one embodiment, the method of making a low density fiber cement article further comprises, optionally including a secondary low density additive comprising perlite at step (a) of the method of making a low density fiber cement article.

In one embodiment, the method of making a low density fiber cement article further comprises, optionally including a hydrophobic agent at step (a) and/or at step (d) of the method of making a low density fiber cement article to improve the water resistance in the low density fiber cement article.

In one embodiment, the elevated temperature and pressure autoclave unit conditions comprise a temperature range of between 160° C. to 190° C. at a saturated steam pressure of approximately 120 psi to 150 psi for a period of approximately 8 to 12 hours.

In one embodiment, the sealing agent comprises at least one a water based resin or solvent based resin selected from the group consisting of aromatic isocyanates, aliphatic isocyanates, blocked isocyanates, an epoxy, silicones, siloxanes, silanes, polyurethanes, acrylates, acrylics, polyester, fluoropolymers, fluorinated acrylics, and styrene acrylics or combinations of the same wherein the resin solids comprise between 2.0%±0.5% and 99.5%±0.5% of the formulation by weight, and more preferably comprise between 5.0%±0.5% and 99.5%±0.5% of the formulation. Optionally the at least one resin further comprises a pigment to provide a coloured or tinted sealing agent.

In one embodiment, the coating agent comprises any suitable exterior or interior paint to provide an exterior coat as desired by the end user on the cured low density fiber cement article.

In some embodiments, a fiber cement material formulation comprises: a cementitious binder and a siliceous material, wherein the cementitious binder and siliceous material comprise between approximately 68 wt % and approximately 79 wt % of a total wt % of the fiber cement material formulation; fiber, wherein the fiber comprises between approximately 7 wt % and approximately 10 wt % of the total wt % of the fiber cement material formulation; alumina trihydrate, wherein the alumina trihydrate in the fiber cement material formulation is between approximately 2 wt % and approximately 4 wt % of the total wt % in the fiber cement material formulation; and a bifunctional low density additive.

BRIEF DESCRIPTION OF THE DRAWINGS

For more complete understanding of the features and advantages of the disclosures described herein, reference is made to a description of the disclosure along with accompanying figures, wherein.

DETAILED DESCRIPTION

Use of such traditional low density materials such as, for example cenospheres and the like, in a fiber cement material formulation enables a low density fiber cement article to be manufactured that is suitable for use in wet and cold climate zones that also has other desired physical performance properties, such as, for example flexural strength.

However such low density materials are costly to purchase, therefore it is desirable to provide an alternate low density fiber cement material formulation for a fiber cement article that achieves similar or enhanced physical performance properties relative to a low density fiber cement material formulation that uses hollow closed cell microspheres.

Accordingly, the fiber cement material formulation of the present disclosure comprises a cementitious binder, a siliceous material, fiber, alumina trihydrate and a bifunctional low density additive. The fiber cement formulation advantageously incorporates a synergistically effective amount of a bifunctional low density additive formulated to reduce the density of the resulting fiber cement material and produce a fiber cement article that is suitable for use in wet and cold climate zones and has comparable physical performance properties as fiber cement materials incorporating the more expensive low density additives. The fiber cement material formulation enables a fiber cement article to be manufactured having a density of approximately 1.1 g/cm$^3$ or below. In various embodiments, the density of the fiber cement article can be less than 1.0 g/cm$^3$, less than 0.9 g/cm$^3$, less than 0.8 g/cm$^3$, less than 0.7 g/cm$^3$, less than 0.6 g/cm$^3$, or less than 0.5 g/cm$^3$. In a further embodiment, the fiber cement article has a density between approximately 0.7 g/cm$^3$ and approximately 1.1 g/cm$^3$. In some embodiments, the fiber cement article has a density between approximately 0.5 g/cm$^3$ and approximately 2.0 g/cm$^3$, for example, between approximately 0.6 g/cm$^3$ and approximately 1.9 g/cm$^3$, between approximately 0.7 g/cm$^3$ and approximately 1.8 g/cm$^3$, between approximately 0.8 g/cm$^3$ and approximately 1.7 g/cm$^3$, between approximately 0.9 g/cm$^3$ and approximately 1.6 g/cm$^3$, between approximately 1.0 g/cm$^3$ and approximately 1.5 g/cm$^3$, between approximately 1.1 g/cm$^3$ and approximately 1.4 g/cm$^3$, between approximately 1.2 g/cm$^3$ and approximately 1.3 g/cm$^3$, or any value or range within or bounded by any of these ranges.

In many of the embodiments of the fiber cement material formulations of the present disclosure, the cementitious binder and the siliceous material together form a major component of the fiber cement material formulation. For example, the cementitious binder and the siliceous material can comprise between 50 wt % and 90 wt % of the fiber cement material formulation, or any value or range within or bounded by this range. As another example, the cementitious binder and the siliceous material can comprise between 55 wt % and 85 wt %, between 60 wt % and 80 wt %, between 65 wt % and 75 wt %, or between 67.5 wt % and 72.5 wt % of the fiber cement material formulation, or any value or range within or bounded by these ranges. In some embodiments, the ratio of the siliceous material to the cementitious binder is between 1:0.1 and 1:2.0, or any value or range within or bounded by this range.

In the examples that follow, the cementitious binder and siliceous material comprise between approximately 67 wt % and approximately 82 wt % of the total wt % of the fiber cement material formulation wherein the ratio of siliceous material to cementitious binder ranges between 1:0.5 and 1:1.5.

In some embodiments of the fiber cement material formulation of the present disclosure, the cementitious binder comprises a cement, preferably Portland cement and the siliceous material comprises silica. In some embodiments the silica is silica 200 mesh, wherein the silica has a surface area of approximately 300 to 410 m$^2$/kg. In further embodiments the silica is fine silica, wherein the fine silica has a surface area of approximately 550 to 650 m$^2$/kg. In further embodiments, the siliceous material is a combination of both silica and fine silica, wherein the silica is silica 200 mesh and has a surface area of approximately 300 to 410 m$^2$/kg; and the fine silica has a surface area of approximately 550 to 650 m$^2$/kg.

In the following, exemplary formulations will be shown wherein the cementitious binder comprises between approximately 25 wt % and approximately 45 wt % of the total wt % of the fiber cement material formulation and the siliceous material comprises between approximately 25 wt % and approximately 50 wt % of the total wt % of the fiber cement material formulation, such that the combined total weight of the cementitious binder and siliceous material comprises between approximately 67 wt % and approximately 82 wt % of the total wt % of the fiber cement material formulation and wherein the ratio of siliceous material to cementitious binder ranges between 1:0.5 and 1:1.5.

In some embodiments, the cementitious binder comprises between approximately 20 wt % and approximately 50 wt % of the total wt % of the fiber cement material formulation, or any value or range within or bounded by this range. For example, the cementitious binder can comprise between approximately 25 wt % and approximately 45 wt %, between approximately 30 wt % and approximately 40 wt %, between approximately 32.5 wt % and approximately 37.5 wt %, or between approximately 35 wt % and approximately 40 wt % of the total wt % of the fiber cement material formulation, or any value or range within or bounded by these ranges. As another example, the cementitious binder can comprise between approximately 35% and approximately 37% of the total wt % of the fiber cement material formulation. As discussed elsewhere herein, the cementitious binder can be Portland cement.

In some embodiments, the siliceous material comprises between approximately 20 wt % and approximately 60 wt % of the total wt % of the fiber cement material formulation, or any value or range within or bounded by this range. For example, the siliceous material can comprise between approximately 25 wt % and approximately 55 wt %, between approximately 30 wt % and approximately 50 wt %, between approximately 35 wt % and approximately 45 wt %, between approximately 37.5 wt % and approximately 42.5 wt %, or between approximately 40 wt % and approximately 45 wt % of the total wt % of the fiber cement material formulation, or any value or range within or bounded by these ranges. As discussed elsewhere herein, the siliceous material can be silica. As another example, the siliceous material can comprise between approximately 41 wt % and approximately 44 wt % of the total wt % of the fiber cement material formulation.

In some embodiments of the fiber cement material formulations of the present disclosure, the fiber comprises between approximately 7 wt % and approximately 10 wt % of the total wt % of the fiber cement material formulation. In some embodiments, the fiber comprises between 2 wt % and approximately 15 wt % of the total wt % of the fiber cement material formulation. For example, the fiber can comprise between approximately 4 wt % and approximately 13 wt %, between approximately 6 wt % and approximately 11 wt %, between approximately 8 wt % and approximately 10 wt %, or between approximately 6 wt % and approximately 12 wt % of the total wt % of the fiber cement material formulation, or any value or range within or bounded by these ranges. As another example, the fiber can comprise between approximately 7.5 wt % and approximately 9.5 wt % of the total wt % of the fiber cement material formulation.

In one embodiment, the fibers are cellulose fibers sourced from Kraft pulp, wherein the cellulose fibers have a length that is in the range of approximately 2 mm to 7 mm. In some embodiments, the cellulose fiber is bleached cellulose fiber, wherein the bleached fiber has a kappa number of between 0 and 5 by TAPPI method T236. In further embodiments, the cellulose fiber is unbleached cellulose fiber, wherein the unbleached fiber has a kappa number of between 20 and 30 by TAPPI method T236, or between 22 and 28 by TAPPI method T236. In a further embodiment, the cellulose fiber is a combination of bleached and unbleached cellulose fiber, wherein the bleached fiber has a kappa number of between 0 and 5 by TAPPI method T236 and the unbleached fiber has a kappa number of between 20 and 30 by TAPPI method T236, or between 22 and 28 by TAPPI method T236.

It is generally known that using identical quantities of bleached fiber instead of unbleached fiber will improve the flexural strength of a fiber cement product. It is also generally known that the use of identical quantities of bleached fiber over unbleached fiber will have little impact on the density of a fiber cement product. Due to the cost of bleached fiber when compared to regular unbleached fiber, the various exemplary formulations in the following were made using unbleached fibers unless otherwise stated. It was therefore necessary to conduct a preliminary analysis to determine how much the flexural strength of a fiber cement product formed from a fiber cement formulation will vary when comparing identical formulations using bleached and unbleached fibers respectively.

As discussed elsewhere herein, in some embodiments of the fiber cement material formulation of the present disclosure, the fiber cement material formulation comprises alumina trihydrate. The alumina trihydrate can comprise between approximately 0.5 wt % and approximately 10 wt % of the total wt % in the fiber cement material formulation, or any value or range within or bounded by this range. For example, the alumina trihydrate can comprise between approximately 1 wt % and approximately 9 wt %, between approximately 2 wt % and approximately 8 wt %, between approximately 3 wt % and approximately 7 wt %, between approximately 4 wt % and approximately 6 wt %, between approximately 1 wt % and approximately 10 wt %, between approximately 1 wt % and approximately 9 wt %, between approximately 1 wt % and approximately 8 wt %, between approximately 1 wt % and approximately 7 wt %, between approximately 1 wt % and approximately 6 wt %, between approximately 1 wt % and approximately 5 wt %, between approximately 1 wt % and approximately 4 wt %, or between approximately 1 wt % and approximately 3 wt % of the total wt % in the fiber cement material formulation, or any value or range within or bounded by these ranges. As another example, the alumina trihydrate can comprise between approximately 1 wt % and approximately 3 wt % of the total wt % of the fiber cement material formulation.

As discussed elsewhere herein, in some embodiments of the fiber cement material formulation of the present disclosure, the fiber cement material formulation comprises diatomaceous earth. The diatomaceous earth can comprise between approximately 1 wt % and approximately 15 wt % of the total wt % in the fiber cement material formulation, or any value or range within or bounded by this range. For example, the diatomaceous earth can comprise between approximately 2 wt % and approximately 14 wt %, between approximately 4 wt % and approximately 12 wt %, between approximately 6 wt % and approximately 10 wt %, between approximately 4 wt % and approximately 6 wt %, or between approximately 2 wt % and approximately 8 wt % of the total wt % in the fiber cement material formulation, or any value or range within or bounded by these ranges.

As discussed elsewhere herein, in some embodiments of the fiber cement material formulation of the present disclosure, the fiber cement material formulation comprises a secondary low density additive such as perlite. The perlite can comprise between approximately 1 wt % and approximately 15 wt % of the total wt % in the fiber cement material formulation, or any value or range within or bounded by these ranges. For example, the perlite can comprise between approximately 2 wt % and approximately 14 wt %, between approximately 4 wt % and approximately 12 wt %, between approximately 6 wt % and approximately 10 wt %, between approximately 4 wt % and approximately 6 wt %, or between approximately 2 wt % and approximately 8 wt % of the total wt % in the fiber cement material formulation, or any value or range within or bounded by these ranges. As another example, the perlite can comprise between approximately 5 wt % and approximately 7 wt % of the total wt % of the fiber cement material formulation.

As discussed above, in some embodiments, the fiber cement material formulation includes a bifunctional low density additive and a secondary low density additive. The ratio of the secondary low density additive to the bifunctional low density additive can be between 1:0.5 and 1:2, or any value or range within or bounded by this range. For example, in some embodiments of the fiber cement material formulation, the bifunctional low density additive is diatomaceous earth and the secondary low density additive is perlite and the ratio between the perlite and the diatomaceous earth is between 1:0.5 and 1:2, or any value or range within or bounded by this range. For example, the ratio between the perlite and the diatomaceous earth can be between 1:0.6 and 1:1.8, between 1:0.8 and 1:1.6, between 1:1.0 and 1:1.4, or between 1:0.8 and 1:1.0, or any value or range within or bounded by these ranges.

In the following exemplary test, the control formulation was made firstly using bleached cellulose fiber and secondly separately using unbleached cellulose fiber. The modulus of rupture (MOR), a known measure of the flexural strength of an article was measured using the technique outlined below. A number of fiber cement products were made using the control formulation. The sample size for each of Sample 1 and Sample 2 comprised six samples which were approximately 25.4 cm (10") in width, 25.4 cm (10") in length and 11 mm (0.4") in thickness and pressed under a 311.1 psi (20 ton) pressure in order to replicate the approximate density of a green sheet when made in a factory using the Hatschek method for making fiber cement articles. The formulations for each of the sample groups were identical but for the fiber component. Sample 1 comprising bleached fiber and Sample 2 comprising unbleached fiber. Sample 1 was found to have an average MOR value of approximately 8.4 MPa. In contrast, the Sample 2 fiber cement products comprising unbleached fiber was found to have an MOR value of approximately 6.2 MPa. Accordingly, in this example the adjustment to MOR when using bleached fibers instead of unbleached fibers in the formulation resulted in the MOR of the resulting fiber cement article increasing by approximately 35%.

Approximately ninety-four further samples were made using the same formulation as Sample 2, i.e. comprising unbleached fibers to validate the theory. In each instance, the MOR value of the resulting fiber cement article was lower than the corresponding fiber cement articles made with an identical formulation comprising bleached fibers instead of unbleached fibers. The average MOR value of the larger sample size was approximately 6.0 MPa resulting in an average MOR increase of approximately 39.5% when using bleached fibers instead of unbleached fibers in the formulation. It is envisaged that in other examples the MOR may not increase by such a percentage amount or indeed it may increase by a larger percentage amount. Accordingly, in the following examples, unless it is stated that bleached fibers were used in the exemplary formulations, all of the resulting MOR values measured with bleached fibers are considered to be acceptable if the MOR value has a % differential between the control of approximately 30-40%, i.e. where the control MOR value is 7.5 MPa, if the exemplary embodiment has an MOR value of between 5.4 MPa and 5.8 MPa, it is considered that a formulation comprising bleached fibers instead of unbleached fibers would achieve the desired flexural strength.

used in a suitable amount in the fiber cement material formulation, acts as a low density additive while also contributing to the overall structural integrity of the fiber cement article.

Figure 1:
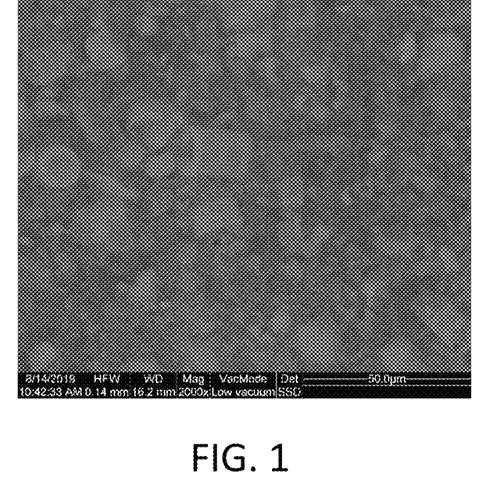
FIG. 1 shows an SEM photo of an exemplary bifunctional low density additive, in the form of diatomaceous earth, suitable for use in the fiber cement material formulation of the present disclosure.

Referring now to FIG. 1, there is shown an exemplary SEM photo of the bifunctional low density additive, diatomaceous earth sample 1, suitable for use in the fiber cement material formulation of the present disclosure. The SEM photograph shows typical morphology of the exemplary diatomaceous earth sample. Analysis of the SEM photo XRF analysis of diatomaceous earth sample 1, together with a further exemplary sample of a natural mineral material, diatomaceous earth—sample 2 are shown in Table One. The analysis results shown in Table One indicate that the major component in diatomaceous earth is silica at approximately 72.9% and 79.6% respectively. XRD analysis indicated that the silica in diatomaceous earth is amorphous, not crystalline silica.

TABLE ONE

XRF analysis of diatomaceous earth sample(s)

| Sample ID | Diatomaceous Earth - DE Sample 1 | Diatomaceous Earth - DE Sample 2 |
|---|---|---|
| % LOI | 7.53 | 10.92 |
| XRF Elemental Oxides ↓ | | |
| SiO2 % | 79.60 | 72.9 |
| Al2O3 % | 6.58 | 8.9 |
| Fe2O3 % | 2.52 | 3.3 |
| CaO % | 0.48 | 1.3 |
| MgO % | 0.16 | 0.6 |
| Na2O % | 0.20 | 0.9 |
| K2O % | 0.50 | 0.6 |
| TiO2 % | 0.25 | 0.4 |
| SO3 % | 0.26 | 0.0 |
| P2O5 % | 0.06 | 0.2 |
| Mn2O3 % | 0.03 | 0.0 |
| Cr2O3 % | 0.00 | 0.0 |
| SrO % | 0.028 | 0.0 |
| BaO % | 0.046 | 0.0 |
| Sum of Concentrations | 98.25 | 100.0 |

Particle size analysis of the diatomaceous earth sample indicates that the average particle size distribution ranges

TABLE A

| | Cement | Silica | Cellulose Fibers unbleached | Cellulose Fibers bleached | Alumina trihydrate | Low Density Additives Closed Cell Spheres |
|---|---|---|---|---|---|---|
| | | | % Weight | | | |
| Sample 1 | 40 | 35 | | 10 | 3 | 12 |
| Sample 2 | 40 | 35 | 10 | | 3 | 12 |

Diatomaceous Earth (DE):

In one embodiment, the bifunctional low density additive of the fiber cement material formulation is selected from the group of natural and/or processed low cost mineral materials. Natural or processed low cost mineral materials have generally been regarded as less effective at reducing density and also as negatively impacting machine operability and runability during the manufacturing process. It has now been found that the natural mineral material diatomaceous earth comprising at least approximately 70% amorphous silica, if between 45 and 425 μm. The density of the diatomaceous earth sample, as measured using a pycnometer, was determined to be between approximately 2.3 g/cm$^3$ and 2.4 g/cm$^3$, indicating that diatomaceous earth is an open cell structure rather than a closed cell structure of traditional low density additives used in fiber cement materials. The tapped bulk density of the diatomaceous earth samples used as a suitable bifunctional low density additive is between approximately 0.3 and 0.6 g/cm$^3$, Diatomaceous earth sample 1 having a tapped bulk density of approximately 0.5 g/cm$^3$, while diatomaceous earth sample 2 has a tapped bulk density of approximately 0.3 g/cm$^3$. Accordingly, it is hypothesised that any diatomaceous earth sample comprising at least approximately 70% amorphous silica and having a bulk density between approximately 0.3 and 0.6 g/cm$^3$ is suitable for use as a bifunctional low density additive in the fiber cement material formulation.

A number of example formulations in accordance with the present disclosure, as shown in Table Two were formulated to assess the performance of diatomaceous earth as a low density additive relative to a control in which the low density additive is hollow closed cell cenospheres. The example formulations were tested to assess their density relative to the control formulation comprising closed cell spheres as the low density additive. The exemplary formulations comprised diatomaceous earth—sample 1. The total % weight of cement and silica in exemplary formulations 1 to 4 range between 67% weight and 82% weight percent of the total % weight of the formulation. In this instance the ratio of silica to cement ranges between 1:0.8 and 1:1.4. Each of exemplary formulations 1 to 4 were made using unbleached fibers rather than bleached fibers. Diatomaceous earth was added to the formulation at 7% weight, 10% weight, 15% weight and 22% weight as outlined in Table Two.

maceous earth increases in the fiber cement material formulation. It was noted that samples containing 7 wt % diatomaceous earth reduced the density of the material to 1.2 g/cm$^3$. As the % diatomaceous earth increased in the fiber cement formulation, the resulting density of the fiber cement article decreased such that the fiber cement article was on a par with the density of the control example. Without being bound by theory, it is considered that during the manufacture of a fiber cement article using diatomaceous earth as a bifunctional low density additive in the fiber cement material formulation, the particle size of diatomaceous earth allows the particles of the components to pack together easily thereby improving particle packing of a fiber cement green sheet during formation stage.

It was also found that the flexural strength (MOR) of the fiber cement exemplary formulations 1 to 3 were higher than the control example. Although the flexural strength of exemplary formulation 4 was not as high as the control example, the % difference in flexural strength of exemplary formulation 4 relative to the control is approximately 22%, accordingly exemplary formulation 4 was deemed to be within the tolerated limits due to the use of unbleached fibers over bleached fibers in the exemplary formulation. Accordingly, when diatomaceous earth is added to the exemplary formu-

TABLE TWO

| | | | Cellulose Fibers | | Alumina | Low Density Additives | |
| | | | | | | Closed Cell | Diatomaceous |
| Examples | Cement | Silica | unbleached | bleached | trihydrate | Spheres | Earth |
| | | | | % Weight | | | |
|---|---|---|---|---|---|---|---|
| CONTROL | 40 | 35 | | 10 | 3 | 12 | |
| 1 | 38 | 44 | 9 | | 2 | | 7 |
| 2 | 38 | 41 | 9 | | 2 | | 10 |
| 3 | 38 | 36 | 9 | | 2 | | 15 |
| 4 | 38 | 29 | 9 | | 2 | | 22 |

Each of the control and exemplary formulations 1 to 4 were formed into samples which were approximately 25.4 cm (10") in width, 25.4 cm (10") in length and 11 mm (0.4") in thickness and pressed under a 311.1 psi (20 ton) pressure in order to replicate the approximate density of a green sheet when made in a factory using the Hatschek method for making fiber cement articles.

Test Results:

A Modulus of Rupture (MOR) test was conducted on each of the control and the exemplary samples 1 to 4 to determine the flexural strength of the article formed from each exemplary formulation of the present disclosure. MOR was measured using a standard three point bend test with a 21.5 cm (8.5") span. The average MOR (MPa) for the samples as outlined below in Table Three.

TABLE THREE

| Examples | MOR MPa | Density g/cc | Porosity % |
|---|---|---|---|
| CONTROL | 7.46 | 1.09 | 38.7 |
| 1 | 8.13 | 1.2 | 42.4 |
| 2 | 8.12 | 1.18 | 39.3 |
| 3 | 7.6 | 1.15 | 44.7 |
| 4 | 6.1 | 1.1 | 39.4 |

The bulk density of diatomaceous earth is low due to the hollow structure of the mineral material. The density of the exemplary formulations decrease as the quantity of diatolations in a % wt range between 7 wt % and 22 wt % and bleached fibers is used instead of unbleached fibers the resulting flexural strength will be approximately 35 to 40% higher than the current recorded values 6.1 MPa and 8.1 MPa respectively.

Diatomaceous earth is a pozzolanic material, in which the major component is amorphous silica. Amorphous silica is more reactive than crystalline silica. Without being bound by theory, it is considered the amorphous silica in diatomaceous earth reacts with calcium hydroxide from excess lime water to form a secondary source of calcium silicate hydrate (CSH). The secondary source of CSH within the fiber cement matrix can form CSH gel or further react with $SiO_2$ when cured in an autoclave environment to form Tobermorite. Both the CSH gel and Tobermorite are considered to be major strength contributors to the fiber cement product after curing. However, when the formulation comprises approximately 22 wt % diatomaceous earth, the quantity of diatomaceous earth no longer begins to adversely affect the flexural strength. Although the MOR value of 6.1 MPa is considered to be similar to the MOR value of the control example, it is noted that while diatomaceous earth initially improves the flexural strength of the fiber cement article relative to the control example, the overall trend as the quantity of diatomaceous earth increases is that the flexural strength decreases in a non-linear manner.

Accordingly, in one embodiment, a suitable range of diatomaceous earth comprising at least approximately 70% amorphous silica in the fiber cement material formulation is between approximately 7 wt % and approximately 22 wt % of the total wt % in the fiber cement material formulation. In another embodiment, a suitable range of diatomaceous earth comprising at least approximately 70% amorphous silica in the fiber cement material formulation is between approximately 10 wt % and approximately 15 wt % of the total wt % in the fiber cement material formulation.

Recycled Autoclaved Fiber Cement Dust (SD):

In a further embodiment, the bifunctional low density additive of the fiber cement material formulation is recycled autoclaved fiber cement dust. Previously, where a cured fiber cement article is milled or processed in a factory, for example, to achieve a desired profile, the resulting sanding or machining autoclaved fiber cement dust was disposed of as waste material. It is now desirable to recycle or reuse this material to minimise environmental impact.

Figure 2:
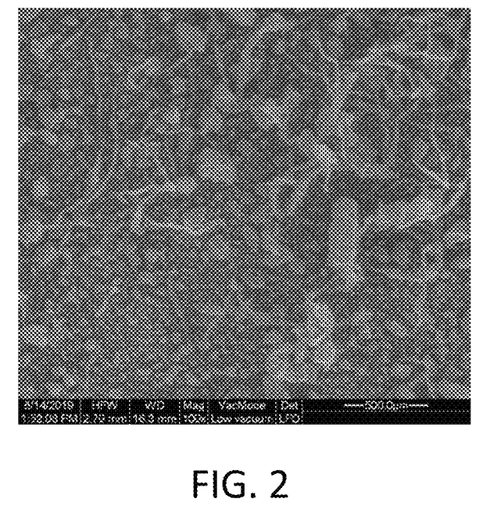
FIG. 2 shows an SEM photo of a further exemplary bifunctional low density additive, in the form of recycled autoclaved fiber cement dust, suitable for use in the fiber cement material formulation of the present disclosure.

Referring now to FIG. 2, there is shown an exemplary SEM photo of the bifunctional low density additive, recycled autoclaved fiber cement dust, suitable for use in the fiber cement material formulation of the present disclosure. The SEM photograph shows typical morphology of the exemplary recycled autoclaved fiber cement dust sample. Phase analysis of the recycled autoclaved fiber cement dust sample is shown in Table Four.

TABLE FOUR

| Sample Identification → | | Sanding Dust |
|---|---|---|
| Phase ↓ | Formula ↓ | % |
| $C_2S$-β | $Ca_2SiO_4$ | 1.0 |
| $C_3S$-mumme | $Ca_3SiO_5$ | 0.9 |
| $C_3S$-triclinic | $Ca_3SiO_5$ | 1.0 |
| $C_4AF$-Brownmillerite | $Ca_4Al_2Fe_2O_{10}$ | 0.3 |
| Calcite | $CaCO_3$ | 2.1 |
| Katoite-silicated | $Ca_3Al_2(SiO_4)_1(OH)_8$ | 6.8 |
| $C_5S_6H_5$-Tobermorite | $Ca_5Si_6O_{16}(OH)_2 \cdot 4H_2O$ | 15.5 |
| Quartz | $SiO_2$ | 28.9 |
| Amorphous Content | | 43.6 |
| Total → | | 100.1 |
| Unreacted Cement → | | 3.2 |
| Tobermorite and Katoite Combined → | | 22.3 |

Chemical analysis of the recycled autoclaved fiber cement dust indicated that the dust comprised cement, silica, alumina trihydrate and fibers. The tapped bulk density of recycled autoclaved fiber cement dust used as a suitable bifunctional low density additive is approximately 0.8 g/cm³.

A number of exemplary formulations in accordance with the present disclosure, as shown in Table Five were formulated to assess the performance of recycled autoclaved fiber cement dust as a low density additive relative to a control in which the low density additive is hollow closed cell cenospheres. The example formulations were tested to assess their density relative to the control formulation comprising closed cell spheres as the low density additive. In the exemplary embodiments 5, 5a, 5b and 6, the quantity of silica present in the recycled autoclaved dust was factored into the total silica quantity by calculating the mass percent of silica in the recycled autoclaved dust. Thus the total % weight of cement and silica in exemplary formulations 5, 5a, 5b and 6 range between approximately 68.5% weight and approximately 81% weight percent of the total % weight of the formulation. In this instance the ratio of silica to cement ranges between 1:0.8 and 1:1.3. Recycled autoclaved fiber cement dust was added to the formulation at 12 wt %, 17.5 wt %, 25 wt % and 30 wt %.

TABLE FIVE

| | | | Cellulose Fibers | | Alumina | Low Density Additives | |
|---|---|---|---|---|---|---|---|
| Examples | Cement | Silica | unbleached | bleached | trihydrate | Closed Cell Spheres | Recycled Autoclaved FC Dust |
| | | | | % Weight | | | |
| CONTROL | 40 | 35 | | 10 | 3 | 12 | |
| 5 | 38 | 39 | 9 | | 2 | | 12 |
| 5a | 38 | 33.5 | 9 | | 2 | | 17.5 |
| 5b | 38 | 26 | 9 | | 2 | | 25 |
| 6 | 38 | 21 | 9 | | 2 | | 30 |

As before, each of the control and exemplary formulations 5, 5a, 5b and 6 were formed into samples which were approximately 25.4 cm (10") in width, 25.4 cm (10") in length and 11 mm (0.4") in thickness and pressed under a 311.1 psi (20 ton) pressure in order to replicate the density of a green sheet when made in a factory using the Hatschek method for making fiber cement articles.

Test Results:

A Modulus of Rupture (MOR) test was conducted on each of the control and the exemplary samples 5, 5a, 5b to 6 to determine the flexural strength of the article formed from each exemplary formulation of the present disclosure. MOR was measured using a standard three point bend test with a 21.5 cm (8.5") span. The average MOR (MPa) for the samples as outlined below in Table Six below.

TABLE SIX

| Examples | MOR MPa | Density g/cc | Porosity % |
|---|---|---|---|
| CONTROL | 7.46 | 1.09 | 38.7 |
| 5 | 7.36 | 1.18 | 37.62 |
| 5a | 5.97 | 1.15 | 34.22 |
| 5b | 5.20 | 1.13 | 39.3 |
| 6 | 4.36 | 1.09 | 35.86 |

The test results indicate that exemplary formulations 5 to 6 reduce the density of the resulting fiber cement article to between 1.2 g/cm³ and 1.1 g/cm³. The flexural strength of the fiber cement articles ranged between 4.4 MPa and 7.5 MPa. Without being bound by theory, it is considered that the unreacted cement in the recycled autoclaved fiber cement dust was hydrated during manufacture of the new fiber cement article and contributed to the new cementitious matrix. It is also considered that the existing tobermorite in the recycled autoclaved fiber cement dust contributed to the strength of the formed fiber cement article. Accordingly, while recycled autoclaved fiber cement dust is suitable for use a bifunctional low density material as it successfully lowers the density of the resulting fiber cement product relative to a fiber cement product that does not have low density materials and it also helps with structural properties such as flexural strength. In the instance when approximately 30 weight % recycled autoclaved fiber cement dust was added to the formulation to achieve a density value that is equivalent to the control the flexural strength of the resulting fiber cement article was less than that of the control.

Further exemplary formulations comprising a combination of diatomaceous earth and recycled autoclaved fiber cement dust as the bifunctional low density additive in the fiber cement material formulation as outlined in Table Seven were also examined. As before, the balance between the cementitious material, siliceous material and fibers is designed to provide overall optimised performance of the resulting fiber cement products. In exemplary embodiments 7 to 9, the quantity of recycled autoclave fiber cement dust was reduced relative to example 5 above, recycled autoclave fiber cement dust ranging between 7.5 wt % and 12 wt %, while the quantity of diatomaceous earth was between 10 wt % and 16 wt %. The quantity of silica present in the recycled autoclaved dust was factored into the total silica quantity by calculating the mass percent of silica in the recycled autoclaved dust. Thus, the total % weight of cement and silica in exemplary formulations 7 to 9 range between 68% weight and 71% weight percent of the total % weight of the formulation. In this instance the ratio of silica to cement ranges between 1:1.2 and 1:1.3. Diatomaceous earth was added to the formulation at 10% weight, 15.2% weight and 16% weight, while the quantities of recycled autoclaved fiber cement dust were reduced to 7.5% weight and 12% weight respectively and combined with diatomaceous earth as outlined in Table Seven.

Test Results:

A Modulus of Rupture (MOR) test was conducted on each of the control and the exemplary samples 7 to 9 to determine the flexural strength of the article formed from each exemplary formulation of the present disclosure. MOR was measured using a standard three point bend test with a 21.5 cm (8.5") span. The average MOR (MPa) for the samples as outlined below in Table Eight below.

TABLE EIGHT

| Examples | MOR MPa | Density g/cc | Porosity % |
|---|---|---|---|
| CONTROL | 7.46 | 1.09 | 38.7 |
| 7 | 6.36 | 1.12 | 40.6 |
| 8 | 6.98 | 1.10 | 45.8 |
| 9 | 6.48 | 1.10 | 46.7 |

The test results shown in Table 8 indicate that exemplary formulations 7 to 9 in which the bifunctional low density additive comprises a combination of diatomaceous earth and recycled autoclaved fiber cement dust reduces the density of the resulting fiber cement articles to the desired level. Although the flexural strength of exemplary formulations 7 to 9 were not as high as the control example, the % difference in flexural strength of exemplary formulations 7 to 9 relative to the control is deemed to be within the tolerated limits due to the use of unbleached fibers over bleached fibers in the exemplary formulation. Accordingly, when diatomaceous earth and recycled autoclaved fiber cement dust are added to the exemplary formulations in a % wt range between 10 wt % to 16 wt % and 7.5 wt % to 12 wt % respectively and bleached fibers is used instead of unbleached fibers the resulting flexural strength will be approximately 35 to 40% higher than the current recorded value range between 6.4 MPa and 7.0 MPa respectively.

Cellulose Dust (CD):

In one embodiment, the bifunctional low density additive of the fiber cement material formulation is cellulose dust, wherein cellulose dust comprises untreated ground wood dust with a particle length of between 40 μm to 100 μm.

TABLE SEVEN

| | | | | | | Low Density Additives | | |
|---|---|---|---|---|---|---|---|---|
| | | | Cellulose Fibers | | Alumina | Closed Cell | Diatomaceous | Recycled Autoclaved |
| Examples | Cement | Silica | unbleached | bleached | trihydrate % Weight | Spheres | Earth | FC Dust |
| CONTROL | 40 | 35 | | 10 | 3 | 12 | | |
| 7 | 38 | 28 | 9 | | 2 | | 10 | 12 |
| 8 | 38 | 28.3 | 9 | | 2 | | 15.2 | 7.5 |
| 9 | 38 | 27.5 | 9 | | 2 | | 16 | 7.5 |

As before, each of the control and exemplary formulations 7 to 9 were formed into samples which were approximately 25.4 cm (10") in width, 25.4 cm (10") in length and 11 mm (0.4") in thickness and pressed under a 311.1 psi (20 ton) pressure in order to replicate the density of a green sheet when made in a factory using the Hatschek method for making fiber cement articles.

Cellulose dust comprises all of the chemical components of wood which are divided substantially into two groups as follows:
  group one comprising structural components of high molecular weight, for example, natural polymer substances (cellulose, hemicelluloses and lignin) which are the major cell wall components; and group two comprising non-structural components of low molecular weight (extractives and inorganic components). The group two extractives can be further classified according to Table Nine below.

The chemical composition of cellulose dust can be generally defined as comprising approximately 40-42% cellulose, approximately 26-28% lignin, approximately 29-34% hemicelluloses and approximately 5-10% extractives/inorganic components.

TABLE NINE

| Major Type Chemical Family | Detailed Chemicals |
|---|---|
| Aliphatic and alicyclic compounds | Terpenes and terpenoids (including resin acids and steroids) |
| | Esters of fatty acids (fats and waxes) |
| | Fatty acids and alcohols |
| | Alkanes |
| Gums (polysaccharides) | Linear structure |
| | Branched structure |
| | Branch-on-branch structure |
| Phenolic compounds | Simple phenols |
| | Stilbenes |
| | Lignans |
| | Isoflavones |
| | Condensed tannins |
| | Flavonoids |
| | Hydrolyzable tannins |
| Other compounds | Sugars |
| | Cyclitols |
| | Tropolones |
| | Amino acids |
| | Alkaloids |
| | Coumarins |
| | Quinones |

A number of exemplary formulations in accordance with the present disclosure, as shown in Table Ten were formulated to assess the performance of cellulose dust as a low density additive relative to a control in which the low density additive is hollow closed cell cenospheres. In the present disclosure, the cellulose dust used as a suitable bifunctional low density additive is a combination of hard and soft wood, wherein the tapped bulk density of cellulose dust is between approximately 0.1 and 0.3 g/cm$^3$. The total % weight of cement and silica in exemplary formulation 10 is 79% weight percent of the total % weight of the formulation, while the total % weight of cement and silica in exemplary formulation 11 is 82% weight percent of the total % weight of the formulation. In this instance the ratio of silica to cement is between 1:0.8 and 1:1.0. Cellulose dust was added to the added to the formulation at 7 wt % and 10 wt %.

approximately 25.4 cm (10") in width, 25.4 cm (10") in length and 11 mm (0.43") in thickness and pressed under a 311.1 psi (20 ton) pressure in order to replicate the density of a green sheet when made in a factory using the Hatschek method for making fiber cement articles.

Test Results:

A Modulus of Rupture (MOR) test was conducted on each of the control and the exemplary sample 10 to 11 determine the flexural strength of the article formed from each exemplary formulation of the present disclosure. MOR was measured using a standard three point bend test with a 21.5 cm (8.5") span. The average MOR (MPa) for the samples as outlined below in Table Eleven below.

TABLE ELEVEN

| Examples | MOR MPa | Density g/cc | Porosity % |
|---|---|---|---|
| CONTROL | 7.46 | 1.09 | 38.7 |
| 10 | 2.16 | 0.99 | 46.2 |
| 11 | 5.07 | 1.09 | 39.0 |

The test results indicate that the quantity of cellulose dust in exemplary formulations 10 and 11 reduce the density of the resulting fiber cement article to the desired level however higher dosage levels as shown in exemplary formulation 10 negatively impact other physical properties such as for example flexural strength.

Further exemplary formulations comprising various combinations of cellulose dust and diatomaceous earth or recycled autoclaved fiber cement dust as the bifunctional low density additive in the fiber cement material formulation are outlined in Table Twelve below. In the exemplary formulations of Table 12, the quantities of cellulose dust is reduced relative to the formulations of Table 10 above, ranging between 2 and 5.2 wt %.

The total % weight of cement and silica in exemplary formulations 12 to 15 range between 77% weight and 79% weight percent of the total % weight of the formulation. In exemplary embodiments the quantity of silica present in the recycled autoclaved dust was factored into the total silica quantity by calculating the mass percent of silica in the recycled autoclaved dust. Thus the total % weight of cement and silica in exemplary formulations 16 to 24 range between 73% weight and 79.5% weight percent of the total % weight of the formulation. In this instance the ratio of silica to cement ranges between 1:0.6 and 1:1.1. In the following exemplary formulations cellulose dust was added to the formulation at 2 wt %, 4 wt % and 5.2 wt %, diatomaceous earth was added to the formulation at 8 wt % and 10 wt %

TABLE TEN

| | | | Cellulose Fibers | | Alumina | Low Density Additives | |
|---|---|---|---|---|---|---|---|
| | | | | | | Closed Cell | Cellulose |
| Examples | Cement | Silica | unbleached | bleached | trihydrate | Spheres | Dust |
| | | | % Weight | | | | |
| CONTROL | 40 | 35 | | 10 | 3 | 12 | |
| 10 | 38 | 41 | 9 | | 2 | | 10 |
| 11 | 38 | 44 | 9 | | 2 | | 7 |

As before, each of the control and exemplary formulations 0 and 11 were formed into samples which were and recycled autoclave fiber cement dust was added to the formulation at 7 wt % to 12.5 wt %.

TABLE TWELVE

| Examples | Cement | Silica | Cellulose Fibers Unbleach | Cellulose Fibers bleach | Alumina trihydrate | Closed Cell Spheres | Low Density Additives Cellulose Dust | Low Density Additives Diatomaceous Earth | Low Density Additives Recycled Autoclaved FC Dust |
|---|---|---|---|---|---|---|---|---|---|
| | | | | | | % Weight | | | |
| CONTROL | 40 | 35 | | 10 | 3 | 12 | | | |
| 12 | 38 | 39 | 9 | | 2 | | 4 | 8 | |
| 13 | 38 | 41 | 9 | | 2 | | 2 | 8 | |
| 14 | 38 | 39 | 9 | | 2 | | 2 | 10 | |
| 15 | 38 | 37 | 9 | | 2 | | 4 | 10 | |
| 16 | 30 | 46.8 | 9 | | 2 | | 5.2 | | 7 |
| 17 | 34 | 42.8 | 9 | | 2 | | 5.2 | | 7 |
| 18 | 38 | 38.8 | 9 | | 2 | | 5.2 | | 7 |
| 19* | 38 | 38.8 | 9 | | 2 | | 5.2 | | 7 |
| 20 | 38 | 39.5 | 9 | | 2 | | 4.5 | | 7 |
| 21 | 42 | 34.8 | 9 | | 2 | | 5.2 | | 7 |
| 22* | 42 | 34.8 | 9 | | 2 | | 5.2 | | 7 |
| 23 | 38 | 38 | 9 | | 2 | | 5.5 | | 7.5 |
| 24 | 38 | 35 | 8 | | 2 | | 4.5 | | 12.5 |

*Fine Silica

As before, each of the control and exemplary formulations 12 to 24 were formed into samples which were approximately 25.4 cm (10") in width, 25.4 cm (10") in length and 11 mm (0.4") in thickness and pressed under a 311.1 psi (20 ton) pressure in order to replicate the density of a green sheet when made in a factory using the Hatschek method for making fiber cement articles.

Test Results:

A Modulus of Rupture (MOR) test was conducted on each of the control and the exemplary samples 12 to 24 to determine the flexural strength of the article formed from each exemplary formulation of the present disclosure. MOR was measured using a standard three point bend test with a 21.5 cm (8.5") span. The average MOR (MPa) for the samples as outlined below in Table Thirteen.

TABLE THIRTEEN

| Examples | MOR MPa | Density g/cc | Porosity % |
|---|---|---|---|
| CONTROL | 7.46 | 1.09 | 38.7 |
| 12 | 6.96 | 1.14 | 37.0 |
| 13 | 7.94 | 1.17 | 40.3 |
| 14 | 7.26 | 1.15 | 38.8 |
| 15 | 6.99 | 1.13 | 37.9 |
| 16 | 5.30 | 1.11 | 37.4 |
| 17 | 5.23 | 1.12 | 37.7 |
| 18 | 5.07 | 1.14 | 37.2 |
| 19* | 7.60 | 1.15 | 39.5 |
| 20 | 5.11 | 1.14 | 38.1 |
| 21 | 4.87 | 1.16 | 40.2 |
| 22* | 7.42 | 1.15 | 36.8 |
| 23 | 5.2 | 1.09 | 37.3 |
| 24 | 5.1 | 1.2 | 37.4 |

*Fine Silica

The test results indicate that the quantity of cellulose dust, either approximately 2 wt % or approximately 4 wt %, when combined with either diatomaceous earth or recycled autoclaved fiber cement dust in exemplary formulations 12 to 24 reduce the density of the resulting fiber cement article to the desired level. Exemplary formulations 12 to 15 which combine cellulose dust with diatomaceous earth show improved flexural strength relative to the control sample. In contrast, exemplary formulations 16 to 24 which combine cellulose dust with recycled autoclaved fiber cement dust, only show improved flexural strength in exemplary formulations 19 and 22 that use fine silica when compared with similar formulations, exemplary formulations 18 and 21 which use regular silica (herein referred to as silica).

Secondary LDA:

Optionally, the fiber cement material formulation further comprises a secondary low density additive, wherein the secondary low density additive is expanded perlite.

A number of exemplary formulations in accordance with the present disclosure, as shown in Table Fourteen were formulated to assess the performance of each of the bifunctional low density additives when combined with the secondary low density additive relative to the control in which the low density additive is hollow closed cell cenospheres. In the present disclosure, the secondary low density additive can be a low cost perlite. Perlites obtained from any one of the following sources exemplify the low cost perlites that are suitable for use in the fiber cement formulation of the present disclosure; P-Grade IMP; LDA3 or HP2000 Dicaperl® Perlite; coated or uncoated, 100N1110 or 100U0010 grade Termolita® Perlite; AGP JH-40 or AGP JH-60 American Garden Perlite; or Imerys-1 (full size range) or Imerys-2 (<500 μm) Imerys Perlite.

The total % weight of cement and silica in exemplary formulations 25 to 34 range between 76% weight and 82% weight percent of the total % weight of the formulation. In exemplary embodiments the quantity of silica present in the recycled autoclaved dust was factored into the total silica quantity by calculating the mass percent of silica in the recycled autoclaved dust. Thus the total % weight of cement and silica in exemplary formulations 27, 27* and 31 have approximately 78% weight percent of the total % weight of the formulation. In this instance the ratio of silica to cement is approximately 1:0.95. In the remaining exemplary formulations of Table Fourteen, the ratio of total % weight of cement and silica is between 1:0.8 and 1:1. The percentage weights of the various components of the exemplary embodiments of Table Fourteen are set out below. In most of the exemplary embodiments the secondary low density additive used was AGP JH-60 American Garden Perlite. It will of course be understood that any of the other perlites listed above could also have been used.

TABLE FOURTEEN

| Examples | Cement | Silica | Cellulose Fibers unbleached | Cellulose Fibers bleached | Alumina trihydrate % W | Spheres | Perlite | DE | CD | SD |
|---|---|---|---|---|---|---|---|---|---|---|
| CONTROL | 40 | 35 | | 10 | 3 | 12 | | | | |
| 25 | 38 | 38.5 | 9 | | 2 | | 5 | 7.5 | | |
| 26 | 38 | 44 | 9 | | 2 | | 4.5 | | 2.5 | |
| 27 | 38 | 38 | 9 | | 2 | | 5.5 | | | 7.5 |
| 27* | 38 | 38 | | 9 | 2 | | 5.5 | | | 7.5 |
| 28 | 36 | 44.5 | | 8.5 | 2 | | 6 | 3 | | |
| 29 | 36 | 43 | | 8 | 2 | | 6 | 5 | | |
| 30 | 36 | 43 | | 8.5 | 2 | | 5.5 | 5 | | |
| 31 | 36 | 42.7 | | 8.5 | 2 | | 5.8 | 5 | | |
| 32 | 36 | 40 | | 8.5 | 2 | | 6 | | | 7.5 |
| 33 | 38 | 44 | 9 | | 2 | | 4 | | 3 | |
| 34 | 38 | 44 | | 9 | 2 | | 4 | | 3 | |
| 35 | 28 | 44.5 | 9 | | 2 | | 4 | | | 12.5 |
| 36 | 28 | 50.5 | 8 | | 2 | | 4 | | | 7.5 |
| 37 | 28 | 48.5 | 10 | | 2 | | 4 | | | 7.5 |
| 38 | 35 | 41.5 | 10 | | 2 | | 4 | | | 7.5 |
| 39 | 42 | 36.5 | 8 | | 2 | | 4 | | | 7.5 |
| 40 | 42 | 34.5 | 10 | | 2 | | 4 | | | 7.5 |
| 41 | 38 | 45 | 9 | | 2 | | 3 | 3 | | |
| 42 | 35 | 49 | 7 | | 2 | | 3 | 4 | | |
| 43 | 42 | 39 | 9 | | 2 | | 3 | 5 | | |
| 44 | 38 | 39.4 | 9 | | 2 | | 5.6 | | | 6.0 |
| 45 | 38 | 35 | 9 | | 2 | | 4 | | | 12.0 |
| 46 | 30 | 42 | 9 | | 2 | | 3 | 14 | | |
| 47 | 44 | 30 | 7 | | 2 | | 3 | 14 | | |
| 48 | 38 | 37 | 9 | | 2 | | 4 | 10 | | |

*Bleached Pulp

As before, each of the control and exemplary formulations 23 to 34 were formed into samples which were approximately 25.4 cm (10″) in width, 25.4 cm (10″) in length and 11 mm (0.4″) in thickness and pressed under a 311.1 psi (20 ton) pressure in order to replicate the density of a green sheet when made in a factory using the Hatschek method for making fiber cement articles.

Test Results:

A Modulus of Rupture (MOR) test was conducted on each of the control and the exemplary samples 23 to 34 to determine the flexural strength of the article formed from each exemplary formulation of the present disclosure. MOR was measured using a standard three point bend test with a 21.5 cm (8.5″) span. The average MOR (MPa) for the samples as outlined below in Table Fifteen.

TABLE FIFTEEN

| Examples | MOR MPa | Density g/cc | Porosity % |
|---|---|---|---|
| CONTROL | 7.46 | 1.09 | 38.7 |
| 25 | 6.48 | 1.07 | 35.9 |
| 26 | 6.04 | 1.09 | 31.2 |
| 27 | 6.32 | 1.08 | 35.3 |
| 27* | 8.60 | 1.12 | 41.9 |
| 28 | 11.93 | 1.13 | 42.5 |
| 29 | 6.25 | 1.10 | 31.7 |
| 30 | 5.90 | 1.10 | 27.3 |
| 31 | 6.00 | 1.11 | 27.1 |
| 32 | 6.00 | 1.10 | 27.1 |
| 33 | 5.18 | 1.09 | — |
| 34 | 6.63 | 1.10 | — |
| 35 | 5.09 | 1.09 | 32.4 |
| 36 | 5.80 | 1.13 | 35.9 |
| 37 | 5.70 | 1.10 | 40.3 |
| 38 | 6.50 | 1.09 | 41.0 |
| 39 | 6.80 | 1.16 | 38.4 |
| 40 | 6.40 | 1.12 | 38.4 |
| 41 | 5.90 | 1.10 | 37.7 |
| 42 | 5.57 | 1.13 | 33.7 |
| 43 | 5.44 | 1.12 | 38.8 |
| 44 | 6.57 | 1.09 | 34.1 |
| 45 | 5.73 | 1.08 | 45.3 |
| 46 | 5.80 | 1.08 | 43.0 |
| 47 | 6.89 | 1.14 | 42.0 |
| 48 | 6.75 | 1.13 | 40.0 |

The test results indicate that the exemplary formulations 23 to 34 shown above reduce the density of the resulting fiber cement article to the desired level. The exemplary formulations also show improved flexural strength relative to the control sample.

It is also possible to include other additives in the fiber cement material formulation of the present disclosure as desired by the end user, such as for example, pigments, biocides, fungicides and so forth. In such instances, the additional materials are usually added to the formulation relative to the dry weight of fibers present in the formulation. Naturally, the overall percentage weights of the other components of the fiber cement material formulation are adjusted accordingly to accommodate any additional materials.

In one embodiment, the present disclosure further provides a fiber cement article comprising any one of the above described fiber cement material formulations comprising a cementitious binder, a siliceous material, fiber, alumina trihydrate and a bifunctional low density additive wherein the bifunctional low density additive comprises one or more of diatomaceous earth, recycled autoclaved fiber cement dust or cellulose dust and wherein the density of the fiber cement article is between approximately 0.8 g/cm$^3$ and approximately 1.1 g/cm$^3$.

In one embodiment, the present disclosure provides a fiber cement article comprising a fiber cement material formulation comprising a cementitious binder, a siliceous material, fiber, alumina trihydrate and a bifunctional low density additive wherein the bifunctional low density additive comprises one or more of diatomaceous earth, recycled autoclaved fiber cement dust or cellulose dust and a secondary low density additive wherein the secondary low density additive comprises perlite; and wherein the density of the fiber cement article is between approximately 0.8 g/cm$^3$ and approximately 1.1 g/cm$^3$.

In a further embodiment, the fiber cement article further comprises a hydrophobic agent comprising a silane based hydrophobic agent which is used to improve water resistance in the finished fiber cement article. In one embodiment, the fiber cement material formulation can be treated with hydrophobic agents through a mixing or coating process. Without being bound by theory, it is understood that silanols increase water resistance because they make the surfaces of the fibers hydrophobic and, when used to treat fiber cement fibers, prevent water from traveling through the fiber cement matrix along the edges of the fibers.

In some embodiments, the hydrophobic agent is mixed with the fiber component of the fiber cement formulation. The hydrophobic agent may be added to the fibers at the time the fiber is mixed with the remaining components of the fiber cement formulation, or may be pre-mixed with the fiber (e.g., for 1 or more minutes) prior to adding the remaining components of the fiber cement formulation.

In some further embodiments, the finished fiber cement article, the finished fiber cement article being either treated or untreated with a hydrophobic agent, is coated. In some embodiments, the finished fiber cement article is coated with a sealing agent comprising at least one a water based resin or solvent based resin selected from the group consisting of aromatic isocyanates, aliphatic isocyanates, blocked isocyanates, an epoxy, silicones, siloxanes, silanes, polyurethanes, acrylates, acrylics, polyester, fluoropolymers, fluorinated acrylics, and styrene acrylics or combinations of the same wherein the resin solids comprise between 2.0%±0.5% and 99.5%±0.5% of the formulation by weight, and more preferably comprise between 5.0%±0.5% and 99.5%±0.5% of the formulation. Optionally, the at least one resin further comprises a pigment to provide a coloured or tinted sealing agent.

In some further embodiments, the finished fiber cement article which is coated with a sealing agent, is further coated with a coating agent, wherein the coating agent comprises any suitable exterior or interior paint to provide an exterior coat as desired by the end user on the cured low density fiber cement article.

It will of course be understood that the scope of the present disclosure is not limited to the specific details described herein, which are given by way of example only, and that various modifications and alterations are possible within the scope of the disclosure as defined in the appended claims.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as 'can', 'could', 'might', or 'may', unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase 'at least one of X, Y, and Z' unless specifically stated otherwise, is otherwise understood with the context as used in general to convey that an item, term, etc. may be either X, Y or Z. Thus, such conjunctive language is not generally intended to imply that certain embodiments require the presence of at least one of X, at least one of Y, and at least one of Z.

Although making and using various embodiments are discussed in detail below, it should be appreciated that the description provides many inventive concepts that may be embodied in a wide variety of contexts. The specific aspects and embodiments discussed herein are merely illustrative of ways to make and use the systems and methods disclosed herein and do not limit the scope of the disclosure. The systems and methods described herein may be used in conjunction with the fiber cement material formulation and fiber cement articles made therefrom, and are described herein with reference to this application. However, it will be appreciated that the disclosure is not limited to this particular field of use.

Some embodiments have been described in connection with the accompanying drawings. The figures are drawn to scale, but such scale should not be limiting, since dimensions and proportions other than what are shown are contemplated and are within the scope of the present disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A fiber cement material formulation comprising:
a cementitious binder and a siliceous material, wherein the cementitious binder and siliceous material comprise between 60 wt % and 85 wt % of the fiber cement material formulation, and wherein the cementitious binder comprises Portland cement, and wherein the siliceous material comprises silica having a surface area between 300 and 700 m$^2$/kg;
fiber, wherein the fiber comprises between 6 wt % and 12 wt % of the fiber cement material formulation, wherein the fiber comprises bleached cellulose fiber, the bleached cellulose fiber having a kappa number of between 0 and 5 by TAPPI method T236;
alumina trihydrate, wherein the alumina trihydrate comprises between 1 wt % and 5 wt % of the fiber cement material formulation;
a bifunctional low density additive, the bifunctional low density additive comprising diatomaceous earth, wherein the diatomaceous earth comprises at least 70% amorphous silica and a tapped bulk density of between 0.3 and 0.6 g/cm$^3$, and wherein the diatomaceous earth comprises between 2 wt % and 10 wt % of the fiber cement material formulation; and
a secondary low density additive, wherein the secondary low density additive comprises perlite, and wherein the perlite comprises between 2 wt % and 10 wt % of the fiber cement material formulation;
wherein a ratio of the perlite to the diatomaceous earth is between 1:0.5 and 1:2.

2. The fiber cement material formulation of claim 1, wherein the diatomaceous earth comprises between 4 wt % and 6 wt % of the fiber cement material formulation.

3. The fiber cement material formulation of claim 1, wherein the perlite comprises between 4 wt % and 8 wt % of the fiber cement material formulation.

4. The fiber cement material formulation of claim 1, wherein the fiber comprises between 8 wt % and 10 wt % of the fiber cement material formulation.

5. The fiber cement material formulation of claim 1, wherein the cementitious binder comprises between 35 wt % and 40 wt % of the fiber cement material formulation.

6. The fiber cement material formulation of claim 1, wherein the siliceous material comprises between 40 wt % and 45 wt % of the fiber cement material formulation.

7. The fiber cement material formulation of claim 1, wherein the silica is silica 200 mesh, and wherein the surface area is between 350 and 410 m$^2$/kg.

8. The fiber cement material formulation of claim 1, wherein a ratio of the siliceous material to the cementitious binder is between 1:0.5 and 1:1.5.

9. A fiber cement material formulation comprising:
a cementitious binder and a siliceous material, wherein the cementitious binder and siliceous material comprise between 60 wt % and 85 wt % of the fiber cement material formulation;
fiber, wherein the fiber comprises between 6 wt % and 12 wt % of the fiber cement material formulation, wherein the fiber comprises cellulose fiber;
alumina trihydrate, wherein the alumina trihydrate comprises between 1 wt % and 5 wt % of the fiber cement material formulation;
a bifunctional low density additive, the bifunctional low density additive comprising diatomaceous earth, wherein the diatomaceous earth comprises between 2 wt % and 10 wt % of the fiber cement material formulation; and
a secondary low density additive, wherein the secondary low density additive comprises perlite, and wherein the perlite comprises between 2 wt % and 10 wt % of the fiber cement material formulation;
wherein the ratio the perlite to the diatomaceous earth is between 1:0.5 and 1:2.

10. The fiber cement material formulation of claim 9, wherein the cementitious binder and siliceous material comprise between 70 wt % and 80 wt % of the fiber cement material formulation, and wherein a ratio of the siliceous material to the cementitious binder is between 1:0.5 and 1:1.5.

11. The fiber cement material formulation of claim 9, wherein the cementitious binder comprises between 35 wt % and 40 wt % of the fiber cement material formulation, and wherein the siliceous material comprises between 40 wt % and 45 wt % of the fiber cement material formulation.

12. The fiber cement material formulation of claim 9, wherein the perlite comprises between 4 wt % and 8 wt % of the fiber cement material formulation, and wherein the diatomaceous earth comprises between 4 wt % and 6 wt % of the fiber cement material formulation.

13. The fiber cement material formulation of claim 9, wherein the diatomaceous earth comprises at least 70% amorphous silica and a tapped bulk density of between 0.3 and 0.6 g/cm$^3$.

14. The fiber cement material formulation of claim 9, wherein the cellulose fiber comprises bleached cellulose fiber, the bleached cellulose fiber having a kappa number of between 0 and 5 by TAPPI method T236.

15. A fiber cement material formulation comprising:
a cementitious binder and a siliceous material, wherein the cementitious binder and siliceous material comprise between 60 wt % and 85 wt % of the fiber cement material formulation;
fiber, wherein the fiber comprises between 6 wt % and 12 wt % of the fiber cement material formulation, wherein the fiber comprises cellulose fiber;
alumina trihydrate, wherein the alumina trihydrate comprises between 1 wt % and 5 wt % of the fiber cement material formulation;
a bifunctional low density additive, the bifunctional low density additive comprising diatomaceous earth, wherein the diatomaceous earth comprises between 2 wt % and 10 wt % of the fiber cement material formulation; and
a secondary low density additive, wherein the secondary low density additive comprises perlite, and wherein the perlite comprises between 2 wt % and 10 wt % of the fiber cement material formulation.

16. The fiber cement material formulation of claim 15, wherein:
the diatomaceous earth comprises between 4 wt % and 8 wt % of the fiber cement material formulation; and
the perlite comprises between 4 wt % and 8 wt % of the fiber cement material formulation.

17. The fiber cement material formulation of claim 15, wherein a ratio of the perlite to the diatomaceous earth is between 1:0.5 and 1:2.

18. The fiber cement material formulation of claim 15, wherein:
the cementitious binder and siliceous material comprise between 70 wt % and 80 wt % of the fiber cement material formulation; and the fiber comprises between 8 wt % and 10 wt % of the fiber cement material formulation.

19. The fiber cement material formulation of claim 15, wherein the diatomaceous earth comprises at least 70% amorphous silica and a tapped bulk density of between 0.3 and 0.6 g/cm$^3$.

20. The fiber cement material formulation of claim 15, wherein the fiber comprises bleached cellulose fiber.

* * * * *